(12) United States Patent
Janus

(10) Patent No.: US 7,635,152 B1
(45) Date of Patent: Dec. 22, 2009

(54) CAR DOOR DAMAGE PREVENTION DEVICE

(76) Inventor: Ronald E. Janus, 15880 Summerline Rd., #300/166, Fort Myers, FL (US) 33908

( * ) Notice: Subject to any disclaimer, the term of this patent is extended or adjusted under 35 U.S.C. 154(b) by 0 days.

(21) Appl. No.: 12/154,918

(22) Filed: May 28, 2008

Related U.S. Application Data

(62) Division of application No. 11/517,614, filed on Sep. 8, 2006, now abandoned.

(51) Int. Cl.
*B60R 19/42* (2006.01)
(52) U.S. Cl. .................................... 293/126; 293/128
(58) Field of Classification Search ................. 293/126, 293/128
See application file for complete search history.

(56) References Cited

U.S. PATENT DOCUMENTS 5,149,166 A * 9/1992 Wille et al. ................. 293/128

* cited by examiner

*Primary Examiner*—Lori L Lyjak
(74) *Attorney, Agent, or Firm*—William E. Noonan

(57) ABSTRACT

A damage prevention device for a car door or car body includes an elongated moulding that is attached to an outer surface of a car door to prevent damage from doors of adjacent cars when opened rapidly. The moulding can be extruded or can be molded. The moulding has flattened ends that can be pushed or wedged into a space created between the hinged door body end and the car body, and the other space between the other end of the door body and the car body.

11 Claims, 3 Drawing Sheets

CAR DOOR DAMAGE PREVENTION DEVICE

RELATED APPLICATION

This is a divisional application and claims the benefit of U.S. patent application Ser. No. 11/517,614 filed Sep. 8, 2006 now abandoned.

FIELD OF THE INVENTION

This invention relates to an elongated polymer form moulding that is mounted across a car door to prevent damage to the door while the vehicle is parked.

BACKGROUND OF THE INVENTION

It is a well known fact that cars be parked adjacent to each other in parking lots or parking garages invariably receive dents from doors of cars next to each other when they are irresponsibly opened. While most parking spaces are marked, many drivers do not make an effort to park parallel within the marked lines. This results in many car doors being too close to each other. When such doors are opened, they are apt to dent and ding the adjacent door.

John McElroy, Automotive Journalist, moderator, and host of "Autoline Detroit", a nationally syndicated program airing on the "Speed Channel", recently addressed the issue of the lack of body side mouldings. The journalist stated that many of the automobile manufacturers have elected to eliminate body side mouldings. While this step was great for automotive design, giving a car a clean and pleasing look, it didn't do anything to prevent dings and dents from appearing on doors and side panels of cars.

Car manufacturers have shown they are well aware of these problems by permanently installing mouldings on the full width of the door and often at the widest profile of the door exhibiting the most outer surface. However, most cross sectional profiles of car doors are not the same due to different makes of cars. As a result, the edges of the doors hardly ever match the profile of the adjacent cars, again resulting in damages.

U.S. Pat. No. 5,879,037 is an example of a typical product for preventing damage to adjacent car doors. In this disclosure, a pad is used that consists of a semi-rigid foam material with a flexible urethane lining sealing the interior. The flexible urethane lining is used to seal attracting magnets within the backside. While this may work very well, the protecting pad may be stolen when attached. The magnets may have a detrimental effect on the paint of the door, especially, if the paint is of a metallic nature causing the molecules in the paint to be rearranged and thus marring the appearance of the paint. In recent years, many car manufacturers have used fiberglass material on roofs and doors of cars. In this case, the magnets would be ineffective. Also, magnets over a period of time lose their magnetic attraction. The inventive design of the present invention will alleviate all the above noted problems.

SUMMARY OF THE INVENTION

It is therefore an object of the present invention to provide a highly effective and easy to install device for preventing dents, dings and scratches to the door of a parked car.

It is a further object of this invention to provide a car damage prevention device that is useful and effective for virtually all makes and models of automobiles.

It is a further object of this invention to provide a car door damage device that features a cost effective and simple to manufacture one-piece construction.

It is a further object of this invention to provide a car door damage device that effectively resists theft when installed in a parked vehicle.

The protective car door damage device of this invention consists of a polymer based foam material in the form of a flexible cylindrical tube and is sized to fit a majority of the linear measurement of most automobile panels. The unique feature of this invention is the ability to secure the cylindrical tube to the outside of a door panel involving no tools and no other implements to accomplish the fastening. At the end of each tube there are flattened strips that extend from each end of the protective tube and are inserted between the car body and the door body when the door is opened as soon as the door is closed, the flattened strips are wedged between the car body and the door body in a permanent manner as long as the door remains closed. The protective device cannot be stolen unless it is ripped apart, whereby it is of no further use to anybody.

DETAILED DESCRIPTION OF PREFERRED EMBODIMENTS

Other objects, features and advantages will occur from the following description of a preferred embodiment and the accompanying drawings, in which.

Figure 1:
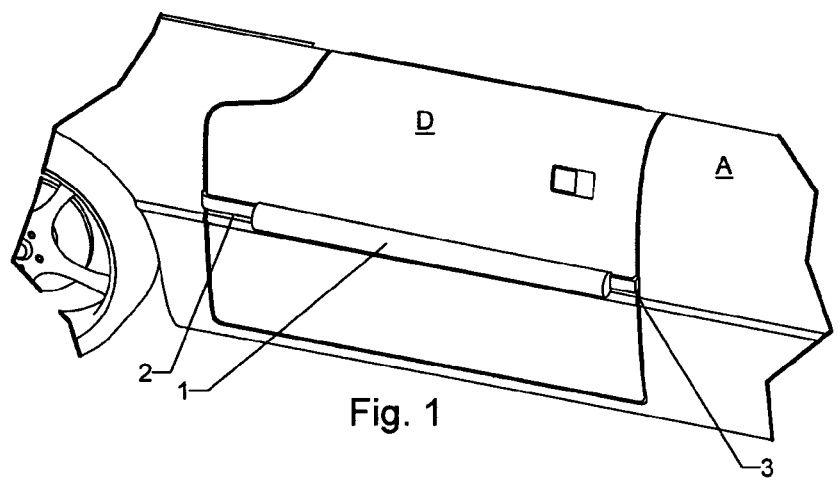
FIG. 1 is a perspective view of a cylindrical moulding installed on a car door.
Figure 2:
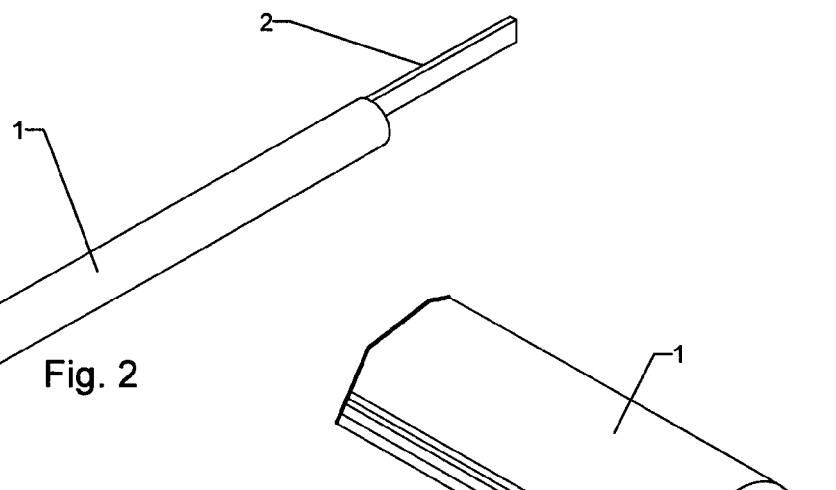
FIGS. 2-4 show the various elements used to install the moulding.
Figure 3:
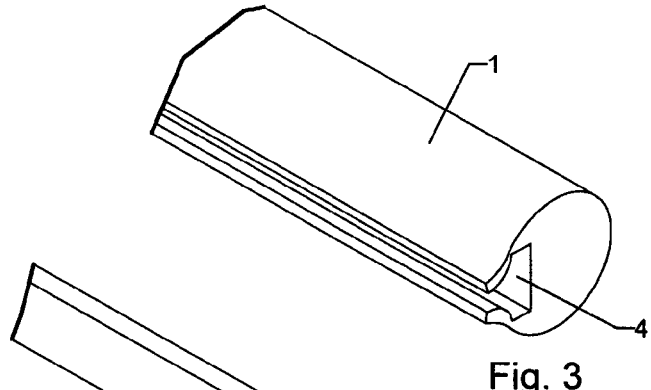
Figure 4:
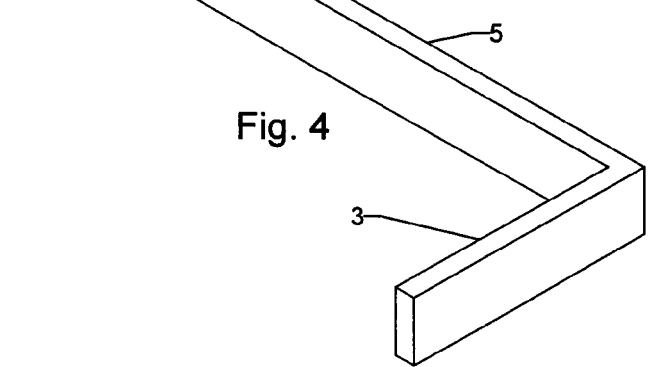
Figure 5:
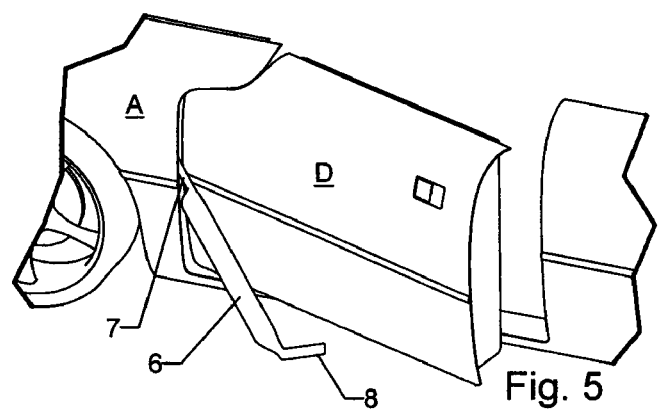
FIGS. 5-8 show different, preferred embodiments of mouldings being installed on a car door.

FIG. 1 illustrates a perspective view of a partially shown car A having a closed door D thereon, while FIGS. 2-4 show the individual elements of the protective moulding 1. The closed door has a protective flexible cylindrical moulding 1 attached thereon. The cylindrical moulding is made of a polymer based foam material and can be extruded in its present form. The moulding 1 has attached thereto a longitudinal strap 5 by way of a dove-tail recess 4 into which the longitudinal strap 5 can be press fitted. The longitudinal strap 5 has a squared-off end 3 which is hooked over the open door edge while the other end 2 of the strap 5 is placed between the car body and the open door body. When the door is closed, the end 2 of the strap 5 is wedged between the car body and the door body while the squared-off end is locked between the rear edge of the door and the corresponding car body.

Figure 6:
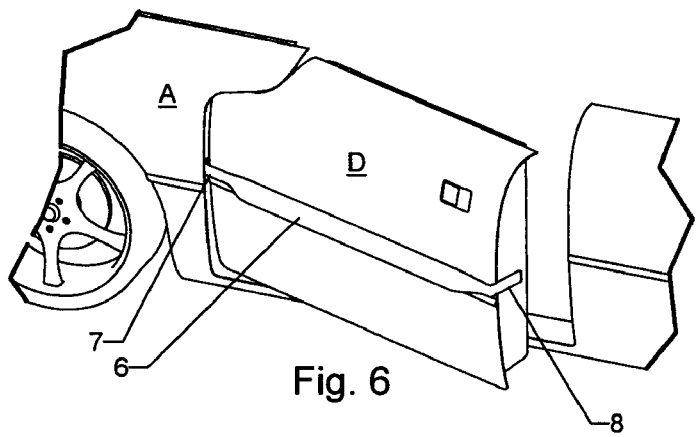
Figure 7:
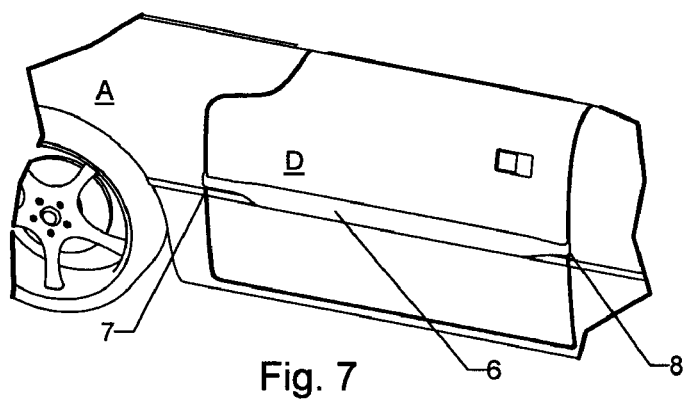

The preferred moulding shown in FIGS. 5-8 cannot be extruded as was explained in FIGS. 1-4 but this system has to be molded. In FIG. 6 the one piece moulding 6 is similar in effect and similar in materials and effect as was the moulding shown in FIGS. 1-4 but there is no secondary longitudinal strap 5 which is received in the dovetail 4 of the cylindrical moulding 1. The protective moulding 6 in FIGS. 5-8 still has the ends as were shown in FIGS. 1-4. The squared-off end 8 is still received in the open door edge as shown in FIG. 6 and the other open end 7 is received and wedged between the car body and hinged end of the door body. When closing the door the moulding 6 is held in place in the manner as was explained with regard to FIGS. 1-4.

Figure 8:
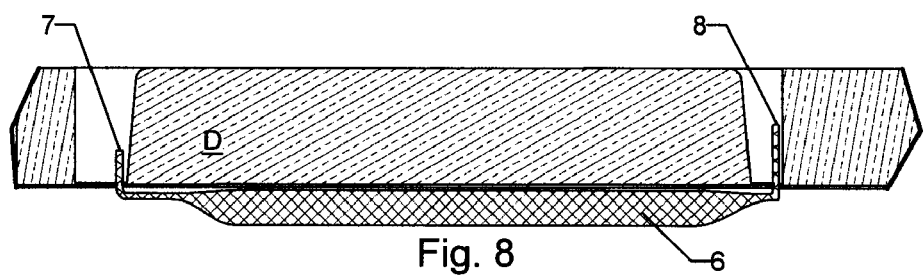

FIG. 8 is a cross section through the molded moulding 6 and in top view D being the door body.

It should be noted at this time that it is immaterial whether the squared-off end is first hooked between the car body and the hinged end of the door body first or at the other end first. This simply is a matter of preference and could be decisive if one is left or right handed.

Figure 9:
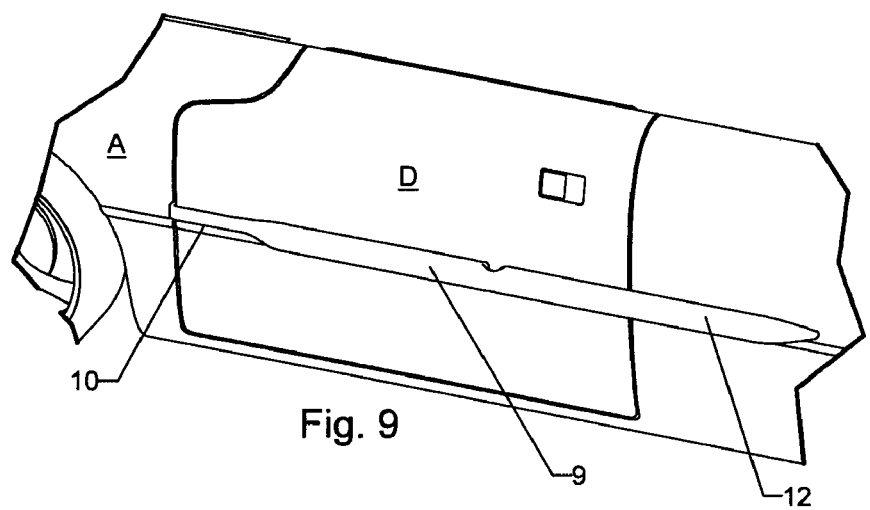
FIGS. 9-11 is an extended version of the moulding being installed on a car door.
Figure 10:
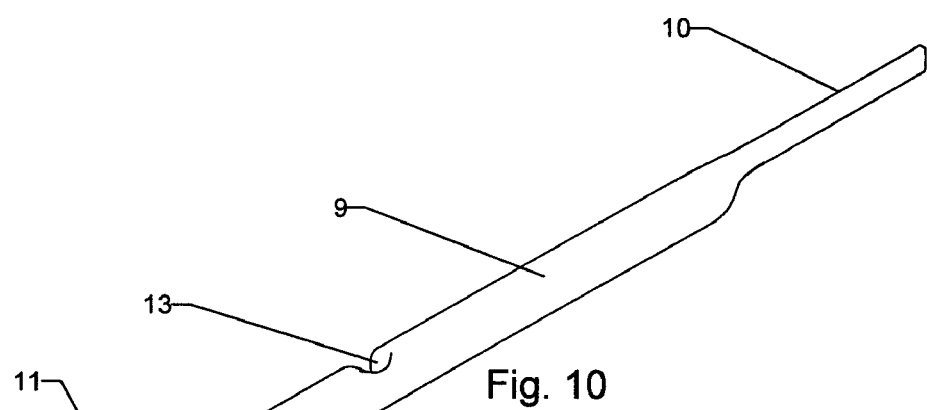
Figure 11:
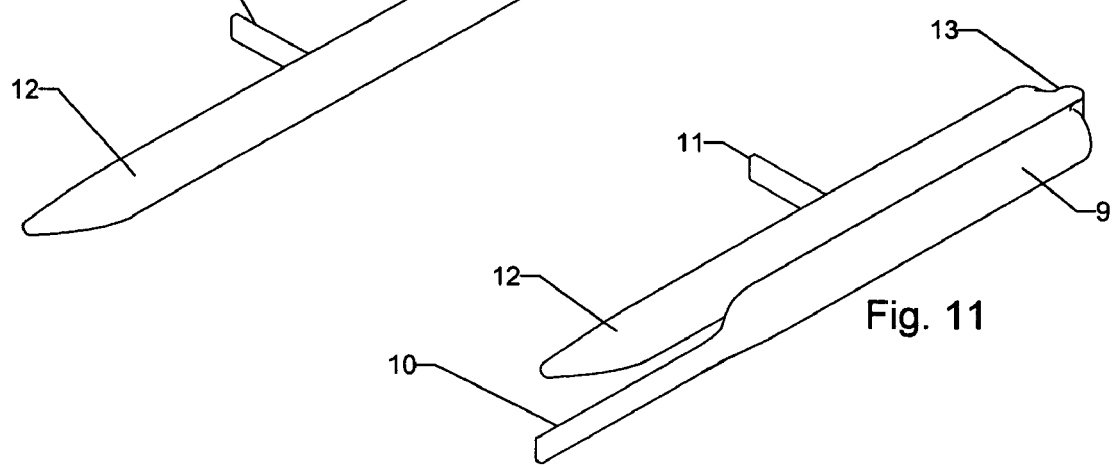

FIGS. 9-11 show still another moulding 9. This moulding 9 is so constructed that it covers more than a door when installed. FIG. 9 is a perspective view of a moulding 9 having an extension 12 thereon which covers more than the door D. This may come in handy when protecting the panels of a two door car and/or four door configuration. This moulding would have to be molded. There is a forward end 10 which is inserted between the car body and the hinged end of the door and will be wedged there between when closing the door. An inner end of the moulding 9 has a perpendicular extension 11 which is similar to the squared-off ends 3 and 8 in the previous FIGS. This perpendicular extension is placed between the edge of the door D and it corresponding car body. When the door D is closed, the perpendicular extension will be wedged therebetween and cannot be dislodged until the door is opened. In this embodiment of the protective moulding, the extension 12 will extend past the door D and will extend over the quarter panel of the car body. This would protect the quarter panel of the two door car from rear doors of an adjacent car which is parked next to the two door car. This prevents dings and dents to be made in the rear panel of the two door (sports) car, when rear doors are opened carelessly.

This moulding 9 is much longer than the previously described mouldings in FIGS. 1-8. Therefore, a notch 13 is molded into the moulding to enable the user to fold the moulding in half when storing the same in the trunk or the back seat of the car.

From the foregoing it may be seen that the apparatus of this invention provides for a car door damage prevention device. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A car door damage prevention device comprising an elongated moulding for extending substantially the length of a car door, said elongated moulding having a cylindrical cross section and made of a polymer foam material, each end of said elongated moulding being molded unitarily with a respective flattened molded foam end such that said elongated moulding and said flattened molded foam ends together define a single, unitary molded foam piece, with each flattened molded foam end for being received in the space between the car body and the hinged end of the door body, and the other edge of the door body and the car body, respectively.

2. A car door damage prevention device comprising an elongated moulding substantially the length of a car door, said device having a cylindrical cross section and made of a polymer foam material, said elongated moulding being molded to include an extension extending beyond the width of a car door; one end of said elongated moulding including a flattened end and an intermediate end of said elongated moulding including a squared-off end to be placed and wedged between the door body, which is opposite said end of said hinged side of said door body, and said car body.

3. A car door damage prevention device comprising an elongated moulding substantially the length of a car door, said device having a cylindrical cross section and made of a molded flexible material, each end of said elongated moulding being molded unitarily with a respective flattened flexible end composed exclusively of a molded flexible material such that said elongated moulding and said flattened ends together define a single, unitary molded flexible piece, with each flattened end for being received in the space between the car body and the hinged end of the door body, and the other edge of the door body and the car body, respectively.

4. The damage prevention device of claim 3 in which said flexible material includes foam.

5. The damage prevention device of claim 4 in which said foam includes a polymer foam.

6. The damage prevention device of claim 1 in which at least one said flattened molded foam end is flexible such that, in an unflexed condition, said flattened end aligns with said elongated moulding and, in a flexed condition, said flattened end extends transversely to said elongated moulding for being received and wedged between the door body and the car body when the door body is closed.

7. The damage prevention device of claim 6 in which at least one of said flattened ends is permanently squared off to extend transversely to said elongated moulding and for being received between the car door body and the car body when the door body is closed.

8. The damage prevention device of claim 3 in which at least one said flattened end is alternatable between an unflexed condition wherein such flattened end is aligned with said elongated moulding and a flexed condition wherein said flattened end extends transversely to said elongated moulding for being received and wedged between the car body and the door body when the door body is closed.

9. The damage prevention device of claim 8 in which at least one of said flattened ends is permanently squared off to extend transversely to said elongated moulding and for being received between the car door body and the car body when the door body is closed.

10. The damage prevention device of claim 6 in which at lest one of said flattened ends is flexible along the length thereof.

11. The damage prevention device of claim 8 in which at least one of said flattened ends is longitudinally flexible to permit said flattened end to be flexed transversely to said elongated moulding at selected locations along the length thereof.

* * * * *